(12) United States Patent
Arzt et al.

(10) Patent No.: US 8,153,254 B2
(45) Date of Patent: Apr. 10, 2012

(54) METHODS FOR MODIFYING THE SURFACES OF A SOLID AND MICROSTRUCTURED SURFACES WITH INCREASED ADHERENCE PRODUCED WITH SAID METHODS

(75) Inventors: Eduard Arzt, Ditzingen (DE); Stanislav Gorb, Leonberg (DE); Huajian Gao, Stuttgart (DE); Ralf Spolenak, Stuttgart (DE)

(73) Assignee: Max-Planck-Gesellschaft zur Foerdurung der Wissenschafter E.V., Munich (DE)

(*) Notice: Subject to any disclaimer, the term of this patent is extended or adjusted under 35 U.S.C. 154(b) by 651 days.

(21) Appl. No.: 10/515,663

(22) PCT Filed: May 26, 2003

(86) PCT No.: PCT/EP03/05512
§ 371 (c)(1),
(2), (4) Date: Jul. 21, 2005

(87) PCT Pub. No.: WO03/099951
PCT Pub. Date: Dec. 4, 2003

(65) Prior Publication Data
US 2006/0005362 A1 Jan. 12, 2006

(30) Foreign Application Priority Data

May 24, 2002 (DE) .................................. 102 23 234

(51) Int. Cl.
*D01F 6/00* (2006.01)
(52) U.S. Cl. ..................... 428/397; 428/400; 428/292.1; 114/88; 114/356; 126/908; 126/569; 264/177.19; 264/211.13; 264/211.14

(58) Field of Classification Search .................... 114/88, 114/356; 126/569, 908, 177.19, 211.13, 126/211.14; 428/292.1
See application file for complete search history.

(56) References Cited

U.S. PATENT DOCUMENTS
4,615,763 A 10/1986 Gelorme et al. ............... 156/643
(Continued)

FOREIGN PATENT DOCUMENTS
DE 156825 3/1981
(Continued)

OTHER PUBLICATIONS

Polymer Data Handbook, Poly(methyl methacrylate), Oxford University Press, 1999, 655-657.*
(Continued)

*Primary Examiner* — Angela Oritz
*Assistant Examiner* — Michael Nelson
(74) *Attorney, Agent, or Firm* — Duane Morris LLP (57) ABSTRACT

Described are methods for surface modification of an object (10) in order to increase the adhesive power of the object, wherein the surface (11) is subjected to structuring so that a multitude of projections (12) are formed, each comprising a foot part and a head part, wherein the head part comprises a front surface (13) which faces away from the surface, wherein each projection (12) is made in a size such that all front surfaces (13) project to the same vertical height above the surface (11), and form an adherent contact surface (14) which is interrupted by mutual spacing between the front surfaces (13).

25 Claims, 6 Drawing Sheets

U.S. PATENT DOCUMENTS

| | | | |
|---|---|---|---|
| 4,946,527 A * | 8/1990 | Battrell | 156/60 |
| 5,755,913 A * | 5/1998 | Liaw et al. | 156/272.6 |
| 6,099,939 A | 8/2000 | Mital et al. | 428/161 |
| 6,107,185 A | 8/2000 | Lukanc | 438/631 |
| 6,764,745 B1 | 7/2004 | Karasawa et al. | 428/141 |
| 6,872,439 B2 | 3/2005 | Fearing et al. | |
| 2001/0028102 A1 | 10/2001 | Hacke | 257/678 |
| 2003/0124312 A1* | 7/2003 | Autumn | 428/141 |
| 2003/0208888 A1* | 11/2003 | Fearing et al. | 24/442 |
| 2004/0005454 A1* | 1/2004 | Full et al. | 428/343 |
| 2004/0071870 A1* | 4/2004 | Knowles et al. | 427/200 |

FOREIGN PATENT DOCUMENTS

| | | | |
|---|---|---|---|
| DE | 19803787 | | 1/1998 |
| EP | 158721 | | 12/1984 |
| JP | WO00/50232 | | 8/2000 |
| WO | WO96/04123 | | 7/1995 |
| WO | WO01/49776 | | 4/1998 |
| WO | WO99/32005 | | 7/1999 |
| WO | WO01/49776 | * | 7/2001 |
| WO | WO03095190 | | 11/2003 |

OTHER PUBLICATIONS

Polymer Data Handbook, Ethylene-vinyl acetate copolymer, Oxford University Press, 1999, 110-113.*

M. Scherge and S.N. Gorb in"Biological Micro- and Nanotribology" Nature's Solutions, (Springer).

International Journal of Material s Research and Advanced Techniques, vol. 93 (2002), No. 45, p. 345-51.

Database Biosis 'Online! Biosciences Information Service', Philadelphia, PA, US; Dec. 2001 Autumn K: "The gecko effect: Dynamic dry adhesive microstructures."

Database Biosys 'Online! Biosciences Informaton Service', Philadelphia, PA, US; Dec. 2001 Jagota A et al: "Gecko feet viewed from the perspective of elastomeric adhesion".

K Autumn et al.: "Adhesive force of a single gecko foot-hair" Nature, 'Online! Bd. 405, Jun. 8, 2000.

H Gee: "Biomechanics-Gripping feat" Nature, 'Online! Jun. 8, 2000.

PCT International Search Report, PCT/EP03/05512, International filing date May 26, 2003.

* cited by examiner

METHODS FOR MODIFYING THE SURFACES OF A SOLID AND MICROSTRUCTURED SURFACES WITH INCREASED ADHERENCE PRODUCED WITH SAID METHODS

RELATED APPLICATIONS

This application is a National Stage of International Application No. PCT/EP03/05512, filed May 26, 2003, which claims priority to German patent application no. 10223234.2, filed May 24, 2002. The entire disclosure of the International Application No. PCT/EP03/05512 is incorporated herein by reference.

The invention relates to methods according to the preamble of claim 1 or 2, in particular methods for microstructuring surfaces of solids; methods for producing a bond from objects with modified surfaces; objects with adhesion-enhancing modified surfaces; as well as connections made with such objects.

Adhesive connections between the same type or different types of materials, which adhesive connections reliably create specified adhesive forces while at the same time being reversibly detachable, are of great importance in the field of technology. Applications comprise for example the detachable connection of components by means of hook and loop connections; the manipulation of objects by means of tools; magnetic holding devices for objects; connection elements on textile products; temporary fixing of objects (e.g. note pads) in offices, and the like. Numerous connection technologies have been developed which are specially adapted to the respective task. For example, it is know in the field of automation technology to reversibly attach objects with suction connections to manipulators and to move said objects with said suction connections. However, such suction connections are associated with considerable technical expenditure. Furthermore, reversible adhesive connections can also be made using adhesive materials. However, this is associated with a disadvantage relating to possibly limited chemical compatibility between the materials connected and the adhesive material used, and also relating to the forming of residues.

Adhesive connections which are free of residues are known; such connections are particularly based on chemical and/or mechanical modification of the surfaces of the materials to be connected. For example, U.S. Pat. No. 5,755,913 describes various options of chemical modification of polymer layers to enhance their adhesive power. For example, the surface components of a polymer layer are modified by chemical treatment or radiation such that free bonding positions, electrostatic interactions, ionic interactions or other bonding appearances occur. However, chemical modification is associated with an important disadvantage in that it is limited to certain polymer materials.

From U.S. Pat. Nos. 6,099,939, 6,107,185 and 4,615,763, mechanical surface modifications are known which are essentially based on the roughening of surfaces. Roughing takes place for example by selective etching. By way of changed surface morphology, the effectively adhering surface of the material is enlarged. Again, this technology is associated with a disadvantage in that it is limited to certain materials, e.g. polymers. Furthermore, these materials also have to be sufficiently soft, because otherwise contact formation is impeded even by the highest elevations on the roughened surface. Lastly, the techniques for roughening surfaces are difficult to control so that quantitatively defined adhesive forces can be set only to a limited extent.

From WO 99/32005 it is known to modify the surfaces of objects by an adhesive element which consists of a layer-shaped carrier and rod-shaped or bar-shaped projections. The carrier is glued onto the object to be modified so that the projections protrude into space, thus causing anchorage to a respectively modified surface of a further object. The attachment element thus does not form an adhesive connection but instead a mechanical anchorage. The rod-shaped or bar-shaped projections necessarily have to be produced so as to provide good stability and matching geometric shapes. Thus, the projections have characteristic cross-sectional dimensions and mutual spacing in the mm range. Additionally, the establishment of a reliable adhesive connection requires an adhesive material.

Modification of the surface morphology of solids is also known in other technical contexts. For example, WO 96/04123 and WO 00/50232 describe a self-cleaning effect of surfaces with a structure comprising elevations and depressions. It has been shown that structured surfaces comprising hydrophobic polymers with typical structuring dimensions above 5 µm have an adhesion-reducing effect.

Research by the inventors shows that in the process of evolution, nature also has developed adhesive systems. They make it possible, for example, for insects to walk on surfaces irrespective of the orientation of said surfaces, or to fix body parts to each other under certain conditions. These adhesive systems are based on the presence of extremely fine hairs, for example on the legs of insects, as has been described by M. Scherge and S. N. Gorb in "Biological Micro- and Nanotribology" (Springer).

Adhesive systems based on adhesive microstructures have also been developed after investigating the structures present on the legs of geckoes (see WO 01/49776). However, these attempts to use the adhesive systems of the gecko in technical applications were limited to transferring the gecko structures to technical objects or to copying said structures in a synthetic geometric sense. Pure copying of gecko structures is however associated with a disadvantage in that the application of respective adhesive systems is limited to ideal smooth surfaces and has substantial limits in respect of the holding forces and their application involving real surfaces, in particular rough or fractal surfaces. It is thus the object of the present invention to provide improved methods for surface modification, with which methods the adhesive power of the modified surfaces is increased, and with which the disadvantages associated with the conventional technologies can be avoided. The method according to the invention is in particular intended to make it possible to form detachable adhesive connections for an enlarged range of materials and surfaces; to provide improved adhesive power on real surfaces, if applicable on uneven surfaces; and to set specified adhesive forces or adhesive characteristics. It is a further object of the invention to provide a method for producing an interconnection involving several objects whose surfaces have been modified so as to enhance their adhesive power. Further objects of the invention relate to the provision of improved surface modifications which make it possible to achieve increased adhesive power.

The above-mentioned objects are met by methods and structured surfaces with the characteristics of the independent claims. Advantageous embodiments and applications of the invention are defined in the dependent claims.

An important characteristic of the methods for surface modification of an object, which methods are described in this document, provides for the surface of a structure to be subjected to the formation of a multitude of projections each comprising a front surface, wherein the projections are dimensioned such that all the surfaces project to the same vertical height above the surface, and thus provide an adherent contact surface which is only interrupted by mutual spacing or gaps between the front surfaces. By means of this measure, the originally closed (unmodified) surface changes to a contact area in which the front surfaces form a multitude of individual contacts (so-called microcontacts). Advantageously, with this splitting-up into microcontacts enhanced adhesion is achieved, as it has been possible to demonstrate by experiments and the theoretical considerations mentioned below. This result is surprising because the contact surface as a sum of the front surfaces at first seems to offer a smaller adhesive surface than the originally unmodified surface. Nonetheless, the adhesive power is increased, and this can even be adapted in a specified manner to meet the requirements of a given application. Arranging the front surfaces at a constant vertical height above the surface provides an additional advantage in that the adhesive connection is not weakened by projecting microcontacts.

According to the invention the projections are formed so as to be inclined in relation to the surface. As a result of the inclination of the projections, when an adhesive connection is made between two objects, a shear component is applied when contact is established, which shear component enhances the adhesive power. Advantageously the inclination, elasticity, dimensioning of the projections and/or their elasticity parameters explained below can be optimised depending on the application.

According to a first important aspect, the above-mentioned object of the invention is met in that the projections are made inclined in relation to the surface, from an elastic material, with a gradient of the elasticity module. If the flexural strength of the projections towards their free end and/or radially across their longitudinal extension is reduced, this results in the following advantages. The inventors have found that an adhesive connection with positive attraction between the structured surface and an adjacent body is formed if the energy gain which results from the adhesion of the contact surface to the body exceeds the elastic energy which is required for bending the projections. By generating the elasticity gradient or flexural strength gradient, advantageously the elastic energy required for bending the projections is reduced, so that the positive adhesive effect is achieved more easily. This advantage is particularly pronounced in the application of the invention to real surfaces, in particular to rough irregularly structured surfaces. Such surfaces have unevennesses which lead to bending of the projections. By the introduction, according to the invention, of the elasticity gradient, the energy loss as a result of bending of the projections is reduced and adhesion is thus improved.

If according to a preferred embodiment of the invention the gradient of the elasticity module is formed between an upper and a lower elasticity value, wherein the upper elasticity value is between 10 MPa and 10 GPa, and the lower elasticity value is between 20 kPa and 10 MPa, advantages can result in relation to a particularly soft bending of the projections, and thus particularly good adhesion improvement can be achieved.

According to a further important aspect of the invention, the above-mentioned object is met in that the projections are formed with an effective elastic module whose size depends on the elasticity module of the material of the projection, its density per unit area, and its geometric dimensions relating to length and diameter, wherein the effective elastic module is set at a value ranging from 20 kPa to 10 MPa. With this measure, the energy loss during bending of the projections on real surfaces is again reduced, and consequently the adhesive effect is improved.

The projections of the surface structure formed according to the invention preferably form an angle of 89° to 45°, in particular 80° to 40 degrees, in relation to the local alignment of the structural surface. Surprisingly it has been shown that even a minimal inclination of the projections at the time contact is established with an adjoining body leads to bending the projections into the desired direction. When these angles of inclination are set, advantages for improved adaptation of the contact surface to a real surface can result.

A contact surface is formed by the totality of the front surfaces. When establishing an adhesive connection, the contact surface touches the surface of the respective other object without establishing an anchorage and without any interlocking of the projections. The adhesive connection is achieved by van der Waals forces. Additional contributions can be made by electrostatic forces or capillary forces. The spacing between the projections is smaller than the cross-sectional dimensions of the front surfaces.

According to a preferred embodiment of the invention, the projections are arranged such that the front surfaces form a regular pattern (or grid). In contrast to conventional roughening of surfaces, periodic arrangement of the projections provides an advantage that weak points in the adhesive connection are avoided and homogenisation of the contacts is achieved.

According to further advantageous embodiments of the invention, the contact surface is formed such that the mutual spacing between adjacent front surfaces is less than 10 μm, in particular less than 5 μm (e.g. 4 μm or less). Furthermore, the characteristic cross-sectional dimensions of the front surfaces are preferably less than 5 μm. These dimensions, which are achieved mutually or independently and if applicable relate only to one reference direction, provide the advantage of particular adhesion improvement. Selecting a dimension depends on the adhesive force to be achieved in a particular application. With a given overall area of microcontacts, the adhesive force increases with the square root from the number of microcontacts. With surfaces modified according to the invention it is even possible to reliably interconnect macroscopic objects, e.g. tools, without the weight of one of the objects being able to interrupt the adhesive connection.

According to an advantageous embodiment of the invention, the front surfaces of the projections, which together form the contact surface, have a curved front surface shape which is preferably implemented as a hemispheric shape, a cylindrical shape, a torus shape and/or a bowl shape. The front surface shape can vary within the multitude of projections. The curved front surface shape, which has resulted from calculations first carried out by the inventors, is associated with an advantage in that the adhesive force of the individual contacts is improved as a result of the above-mentioned geometric shapes. The front surfaces which in the direction of longitudinal extension of the projections curve outward or in the opposite direction, when placed against an adjacent body, provide reduced energy loss during compression, and a more effective area increase so as to improve the adhesion surfaces of the individual contacts.

These advantages are particularly pronounced if the projections are formed by round front surfaces with a diameter ranging from 20 nm to 20 μm, and if a radius of curvature of the front surface shape is formed which is selected so as to be between half the value of the front surface diameter and 5 mm.

A further variant of the invention provides for the projections to comprise head parts which represent a membrane-shaped or paddle-shaped extension of the respective foot parts, wherein the thickness of the head parts is less than the thickness of the foot parts. This design provides a particular advantage in that the head parts of the projections can be bent more easily than the foot parts of the projections, and accordingly, when establishing contact between the structured surface and an adjacent body can be placed against the surface of said body with less loss of energy. Further inclination of the projections towards the structured surface takes place corresponding to the inclination of the projections.

All the head parts are bent with the same orientation relative to the foot parts so that advantageously an asymmetry of the contact structure is achieved. When the adhesion connection is subjected to a load in a direction which is opposite to the orientation of the head parts, the holding force is greater than it is when exposed to a load in a direction which corresponds to the direction of the bent head parts. This difference in the holding force provides additional tangential forces which in an mirror symmetric combination of holding structures of opposite inclination can be utilised effectively.

According to a preferred embodiment of the invention, the thickness of the membrane-shaped head parts ranges from 5 nm to 100 nm, while lateral dimensions (length, width) range from 20 nm to 1000 nm. When these geometric parameters are set, particularly good holding forces can be achieved with little influence on adjacent projections.

If according to a particularly advantageous variant of the invention the membrane-shaped head parts are formed with an elasticity module ranging from 10 MPa to 10 GPa, the energy loss during placement of the structured surface to an adjoining body is advantageously further reduced.

A further important characteristic of the invention, which advantageously can be implemented in both of the above-mentioned aspects of elasticity setting, relates to setting a particularly high aspect ratio, e.g. the ratio of length to thickness of the projections, of at least 5:1. Setting a particularly high aspect ratio has the advantage of providing flexible bending of the projections when establishing contact with the adjoining body.

A further important characteristic of the invention relates to the creation of a hierarchical surface structure in which the front surfaces of projections in turn comprise projections with front surfaces, with the latter themselves carrying projections, if applicable comprising further structured front surfaces. The hierarchical surface structure has the following advantage.

For adhesive systems for the adhesion of certain bodies to smooth surfaces, the surface contacts can be optimally matched as regards their elasticity and geometry per se. However, this only applies to ideal smooth surfaces. In contrast to this, real surfaces are of a fractal structure, such that on various longitudinal scales, unevennesses, roughness and undulations occurs. Typical dimensions of unevenness cover the space frequency spectrum from the mm range via the µm range right through to the nm range. As a result of the above-mentioned hierarchical structure and sub-structure of the projections, the surface structured according to the invention is optimally suited to the real surface area. For each part of the space frequency spectrum of the unevennesses of the adjacent body, the surface structured according to the invention provides a contact structure which adapts to the surface flow of the adjacent body.

It is particularly advantageous if the hierarchical structure comprises at least three structural planes in which the front surfaces of the projections on the structured surface carry fine-structure projections whose front surfaces comprise substructures. If the thickness of the substructure projections ranges from 5 nm to 200 nm, the fine-structure projections are preferably formed with a thickness value which is 10 times to 100 times as large, while the (main) projections in turn are again formed with a thickness value which is 10 times to 100 times as large. When setting these geometric parameters, the structured surface is optimally adapted.

According to an important aspect of the invention, the fine-structure projections and/or substructure projections are made with the use of an electrostatic flocking method which is known per se from the textile industry (see for example EP 158 721, DD 156 825). The application of such a method has a particular advantage in that such structuring can be achieved with a high level of accuracy and reproducibility.

If according to a further embodiment of the invention the projections, whose free ends form the contact surface of the adhesive structure, comprise different types of projections which involve the distribution of various shapes, materials, elasticity characteristics and/or sizes of the projections, as a result of such variability, advantageously an adhesive structure can be formed which universally adheres to any surface.

According to the invention, the structure can be made, integrally in the surface of an object or integrally with a layer-shaped carrier, by a microstructuring technique. In the latter case the carrier is either provided by a surface which has been modified according to the invention, or is attached to an object by means of an adhesive material.

According to the invention, for the purpose of increasing the adhesive power of the microcontacts, the projections or at least the front surfaces can be modified by means of chemical modification of the front surfaces and/or application of an additional adhesive material or a liquid with surface tension (capillary action).

The invention provides a particular advantage in that there are no restrictions in relation to the type of the modified solid-body surfaces. Thus, the contact surfaces according to the invention can in particular be formed in polymer materials, metals, alloys, semiconductors, dielectric solid bodies or ceramics.

A further subject of the invention is a method for establishing a connection between two objects, of which at least part of the surface of at least one object has been modified according to the above-mentioned method. This method is characterised in that the contact surface which is formed on the at least one object, is brought into contact with the other object. In contrast to conventionally modified surfaces, this connection is established without anchorage. No mechanical anchorage is formed between the projections. The contact surface of one object contacts a contact surface or an unmodified surface of the other object.

A further subject is the provision of a structured surface of a solid body with improved adhesive power, wherein said surface is in particular characterised by the above-mentioned contact surface which comprises a multitude of microcontacts.

The invention has the following additional advantages. The adhesive power of contact surfaces is considerably improved when compared to conventionally modified surfaces. Adhesive properties of up to $10^5$ N/m$^2$ (radius ball contact 1 µm) or up to $10^7$ N/m$^2$ (radius ball contact 10 nm) are achieved. Surfaces which have been modified according to the invention make it possible to establish inert adhesive connections, free of residue, which can be applied both in microtechnologies and in conjunction with macroscopic objects. Microstructuring according to the invention can be provided with little expenditure by means of structuring techniques which are available per se.

Further advantages and details of the invention are described below with reference to the enclosed drawings. The following are shown.

THEORETICAL BASIS

Below, the increase in the adhesive power by establishing a multitude of microcontacts is described using the example of hemispherical front surfaces. This merely illustrates the effect achieved according to the invention; it does not however signify any limitation of the front surface geometry used as a model. Instead, as an alternative, the front surfaces can feature other designs, in particular flattened designs, as explained below.

Classical contact theory firstly describes contact between a spherical front surface and a flat hard substrate according to the so-called Hertz equation as:

$$d^3 = (12 \cdot RF)/E^* \quad (1)$$

In this equation R designates the radius of the hemisphere; F the compressive force applied; E* an average elasticity module; and d the diameter of the microcontact between the hemispherical front surface and the substrate. If adhesion effects between the substrate and the front surface are taken into account, this results in a modified equation according to the so-called JKR theory (Johnson, Kendall & Roberts, 1971):

$$d^3 = [(12 \cdot RF)/E^*]\{F + 3\pi R\gamma + [6\pi R\gamma F + (3\pi R\gamma)^2]^{1/2}\} \quad (2)$$

This equation additionally takes into account the adhesion energy γ. The JKR theory results in a finite separation force according to the following equation:

$$F_c = 3/2 \cdot \pi R\gamma \quad (3)$$

Equation (3) shows that, surprisingly, the adhesive force $F_c$ is proportional in relation to the circumference of the microcontact. From this it follows that dividing a closed unmodified surface into a multitude of microcontacts increases the adhesive force according to equation (4):

$$F'_c = (n)^{1/2} \cdot F_c \quad (4)$$

Figure 1:
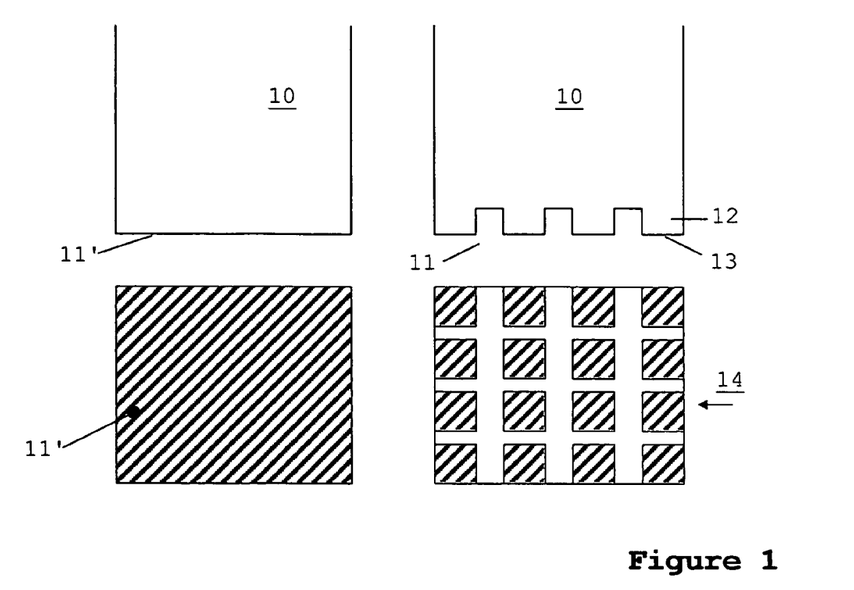
FIG. 1: a diagrammatic illustration of the formation, according to the invention, of a contact surface.

In equation (4), n denotes the number of microcontacts. Thus, by forming microcontacts, the adhesive force can be increased. FIG. 1 diagrammatically illustrates this concept which is also referred to as adhesion increase by a multiplicity of microcontacts.

The left part of FIG. 1 shows a lateral view of an object 10 (top), and a top view of the lower surface 11', which is not structured (below). The right part of FIG. 1 illustrates the microstructuring, provided by the invention, of the surface 11 for producing a multitude of projections 12. Each projection 12 forms a front surface 13 on its side facing away from the object 10. The front surfaces 13 form a multitude of microcontacts. The microcontacts 13 form a contact surface 14 which is interrupted by the spacing between the front surfaces 13 and features an improved adhesive force when compared to the unstructured surface 11', as has been discussed above.

Preferably, the geometric dimensions of the projections 12 are selected as follows: spacing between the front surfaces: 1 nm to 10 μm, in particular less than 5 μm (e.g. 4 μm or less); cross-sectional dimensions of the front surfaces (at least in the direction of the main lateral load, see below): 1 nm to 5 μm, and height: e.g. in the μm range, depending on the application and structuring technique. Various designs of the projections 12 are explained below by way of example with reference to FIGS. 4 to 6.

Figure 2:
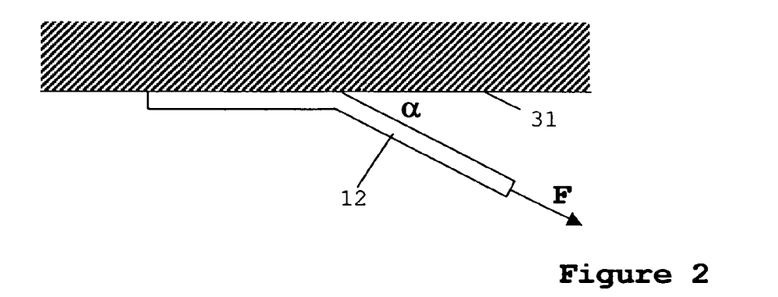
FIG. 2: an illustration relating to the theoretical description of inclined projections of a surface modified according to the invention.

A further improvement in the adhesive force is achieved if with the projections 12 additionally a shearing force is applied, as will be explained below with reference to FIGS. 2 and 3.

The projection 12 is seen as a flexible tape which when forming contact with an adjacent body is inclined by an angle α in relation to the surface 31 of said body. The relation between the separation force F and the van der Waals ultimate resilience work w is expressed in equation (5):

$$wt\delta\alpha = F(1 - \cos\alpha)\delta\alpha + (F^2/Eht)\delta\alpha \quad (5)$$

In equation 5, t denotes the width of the tape; h the thickness of the tape; E the Young module (elasticity module) of the bent part; and δα an infinitesimally small bending of projection 12. Thickness refers to the cross-sectional dimension of the projection according to the direction of inclination relative to the surface. The solution of the quadratic equation (5) results in the detachment force according to equation (6).

$$F = 2wt/\{[(1-\cos\alpha)^2 + \lambda]^{1/2} + (1-\cos\alpha)\}, \text{ wherein}$$
$$\lambda = 4w/Eh \quad (6)$$

In equation 6, λ denotes an elasticity parameter which depends on the ultimate resilience work, the Young module and the thickness h of the projection 12. The invention provides a particular advantage in that a structured surface can be optimised in relation to parameter λ (see below).

The vertical projection of the force F is the variable that is of interest in the context of adhesion between two contacting bodies. It can be shown according to equation 7:

$$W = 2wt \sin\alpha / \{[(1-\cos\alpha)^2 + \lambda]^{1/2} + (1-\cos\alpha)\} \quad (7)$$

It has been shown that as far as the vertical separation force W is concerned, elasticity is of great significance, in particular in the context of small dimensions of the projections and in the context of small Young modules.

Typical parameters which have been selected according to biological adhesive systems are as follows:

$$w \approx 10 \ldots 40 \text{ mJ/m}^2, E \approx 1 \text{ MPa}, h = 1 \text{ μm}, \lambda \approx 0.04 \ldots 0.16$$

Figure 3:
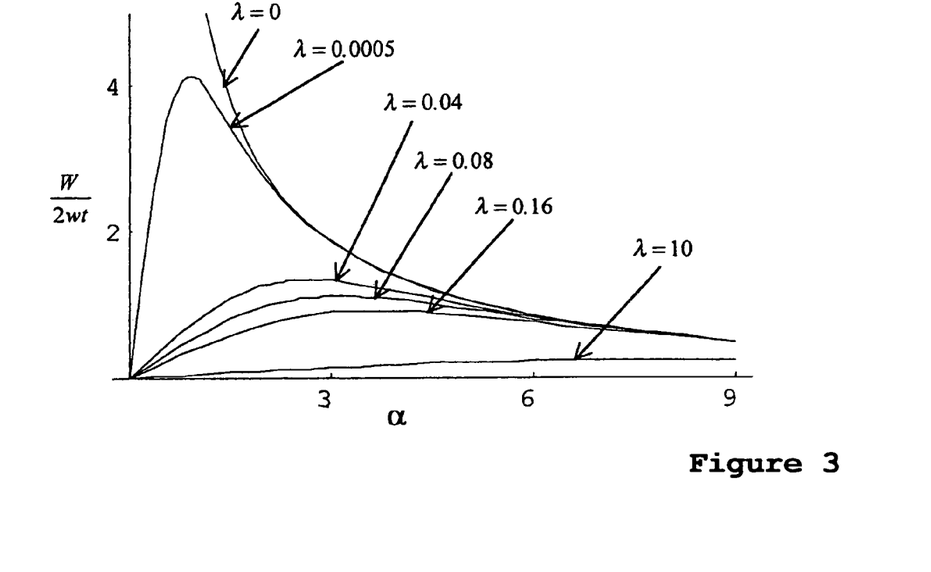
FIG. 3: graphic representations to illustrate optimised elasticity characteristics of contact surfaces formed according to the invention.

FIG. 3 shows the behaviour of the parameter W/wt depending on various angles of inclination α. In the case of small elasticity parameters λ there is a strong dependency between the separation force and the angle of inclination. In a middle region from approximately 0.04 to 0.16 dependence on the angle of inclination is relatively minor, i.e. the vertical separation force is almost constant. With larger λ values the separation force is reduced.

According to the invention, the projections are thus preferably made with such a parameter that the vertical separation force depends as little as possible on the angle. Advantageously this leads to good robustness of adhesive connections. Good robustness manifests itself by the contact strength being independent of the angle α and by partial separation of the connection not automatically leading to complete separation.

Since the elasticity parameter λ depends both on the thickness t of the projection and on the Young elasticity module, structuring can be optimised depending on the materials system and the structure geometry used. For example, if the surface of a hard semiconductor material (e.g. Si) with a high E-value is to be structured, then a small thickness t in the nm range is preferred. In the case of softer materials (plastics) with a lower E-value, the thickness can be greater, i.e. in the μm range.

For practical applications an angle of inclination α=20° to 40°, in particular 30°, is preferred, in which the vertical separation force is at its maximum. This corresponds to an angle of 80° to 50°, in particular 60°, in relation to the surface normal.

Embodiments of Surfaces Structured According to the Invention

Figure 4:
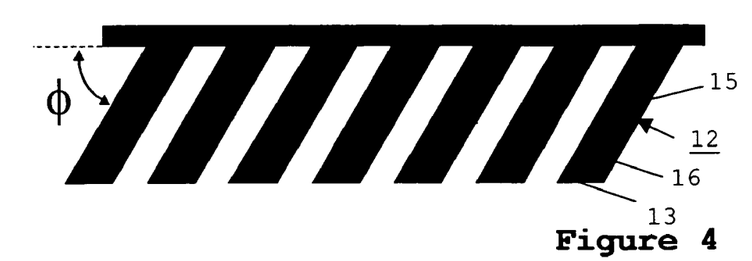
FIGS. 4 to 10: diagrammatic illustrations of important characteristics of surface structures formed according to the invention, corresponding to various embodiments of the invention.

FIG. 4 is an enlarged diagrammatic section view of a surface structure formed according to the invention. This structure provides for a multitude of inclined projections 12, each with a foot part 15 whose free end forms a head part 16 with a front surface 13. The inclination of the projections 12 is of great significance for the adhesion of the structures on technical surfaces (surfaces with fractal roughness) because in their inclined state the projections are more flexible and require less energy for flexing (minimisation of the stored elastic energy). In contrast to straight projections which are provided in conventional adhesive structures, the very considerable energy consumption that would be required for upsetting a straight structure is avoided.

The angle of inclination Φ is for example selected to range from 45° to 89°, in particular 60° to 80°.

Figure 5:
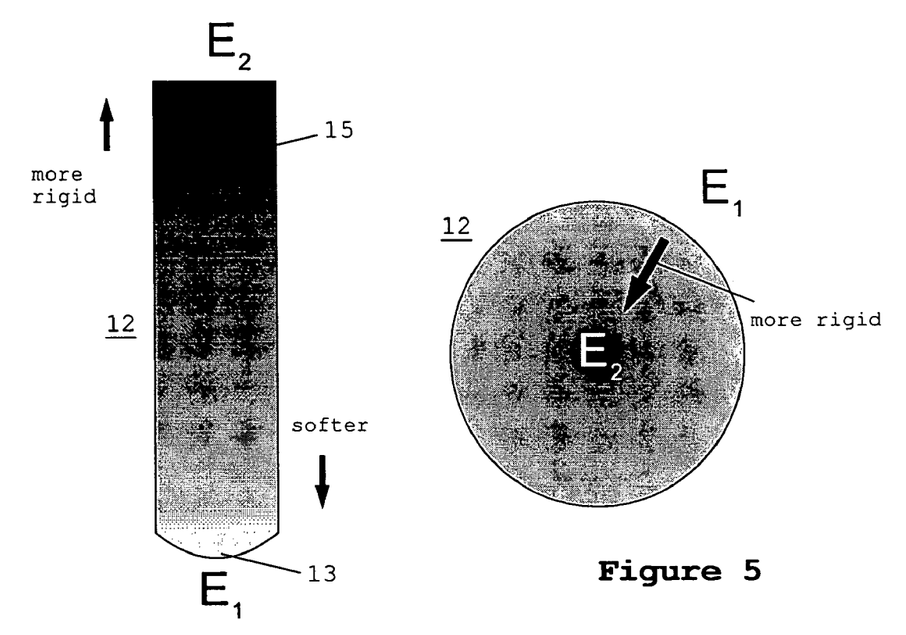

According to the invention, an elasticity gradient is formed in the projections 12, with variants of said elasticity gradient being illustrated in FIG. 5. According to the left sectional image in FIG. 5, the flexural ability is gradually reduced from the foot part 15 towards the front surface 13. This is achieved by setting an elasticity module $E_2$ on the foot part of e.g. 2 GPa, which towards the front surface 13 is reduced to a value of e.g. 20 kPa. Accordingly, the material (e.g. polymer) becomes softer along the projection 12 towards its free end (front surface 13) or more rigid in the opposite direction. As an alternative, or in addition, the right sectional image in FIG. 5 provides for a radial gradient with which the elastic energy during flexing of the projections 12 can also be reduced. For example, the projection 12, in the right sectional image in FIG. 5 shown in an enlarged sectional view with a round diameter, is formed in the interior with an elasticity module $E_2$ of e.g. 2 GPa, which towards the outside towards the lateral surface of projection 12 reduces to a value $E_1$ of e.g. 20 kPa.

Figure 6:
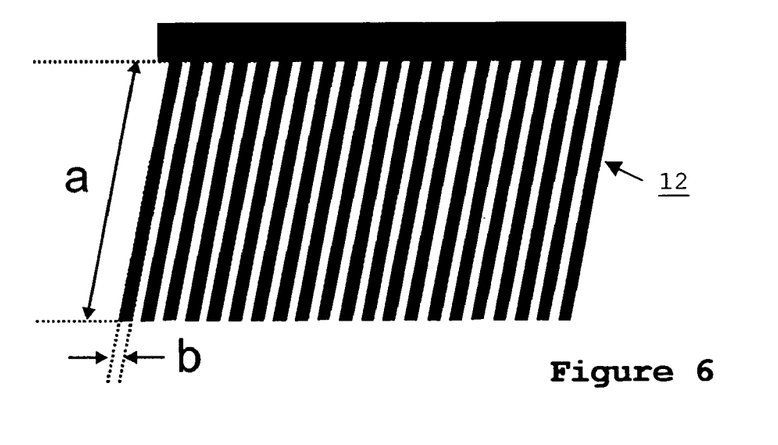

FIG. 6 shows further characteristics of the structure according to the invention with inclined projections 12 with optimised flexural strength. If a high aspect ratio (ratio of length a of the projections 12 to their width in the direction of inclination or their diameter b) of at least 5 is selected, the elastic energy required for flexural loading is reduced. Preferably, the parameters a and b are selected from the following ranges: a: 2000 nm to 200 μm, and b: 20 nm to 10 μm.

The reciprocal value of the aspect ratio a/b also significantly determines the so-called effective elastic module $E^* = E \cdot N \cdot b^2 \cdot (b/a)^2$ wherein E denotes the elasticity module of the material of the projections 12, and N denotes the density per unit area of the contact structures. The density per unit area is e.g. $10^6$ to $10^7$ cm$^{-2}$. The elasticity module e.g. of polyamide is 2 GPa. The variable $E^*$ is preferably set in the range of 20 kPa to 10 MPa.

Figure 7:
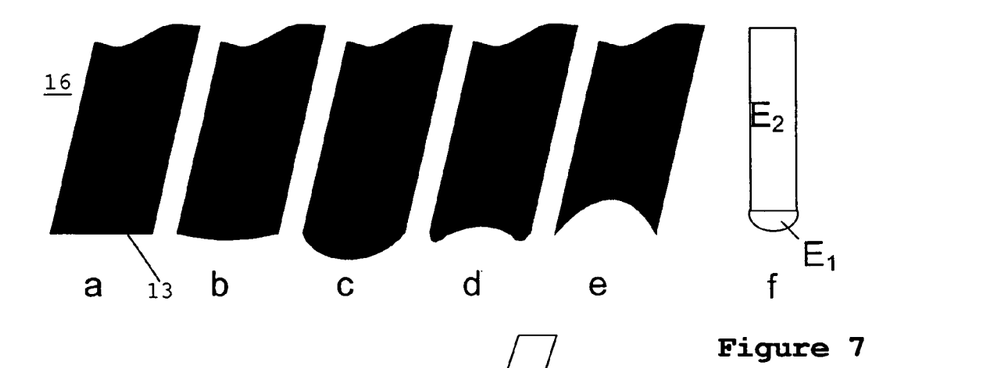

FIG. 7 shows the plane front surface 13 (sectional image a, corresponding to FIG. 4), and also variants of the head parts 16 with the following front surface shapes: hemispheric shape (sectional images b, c, f), cylindric shape or torus shape (sectional image d), or bowl shape (sectional image e). The diameters of the projections 12 are for example in the range of 20 nm to 20 μm, with the radii of curvature in sectional images b and c being selected in the range between 5 mm and half the diameter of the projection. In sectional image a, the radius of curvature is infinite. The cylinder shapes or torus shapes (sectional image d) comprise a concave shape of the front surface of a reduced diameter, which is for example ¹⁄₁₀ of the diameter of the respective projection. The bowl shape (sectional image e) means that the front surface 13 comprises an indentation of curved or almost rectangular cross section.

Sectional image f of FIG. 7 shows a multi-component design of the head part 16 of a projection 12. The head part 16 has a higher elasticity module $E_2$ (e.g. of 10 MPa to 10 GPa) while the front surface 13 is formed from a material of a reduced elasticity module $E_1$ (e.g. in the range of 20 kPa to 10 MPa). Advantageously, this two-component structure, too, is an embodiment of a surface structure with an elasticity module that is reduced towards the free end of the projection.

Figures 8, 9:
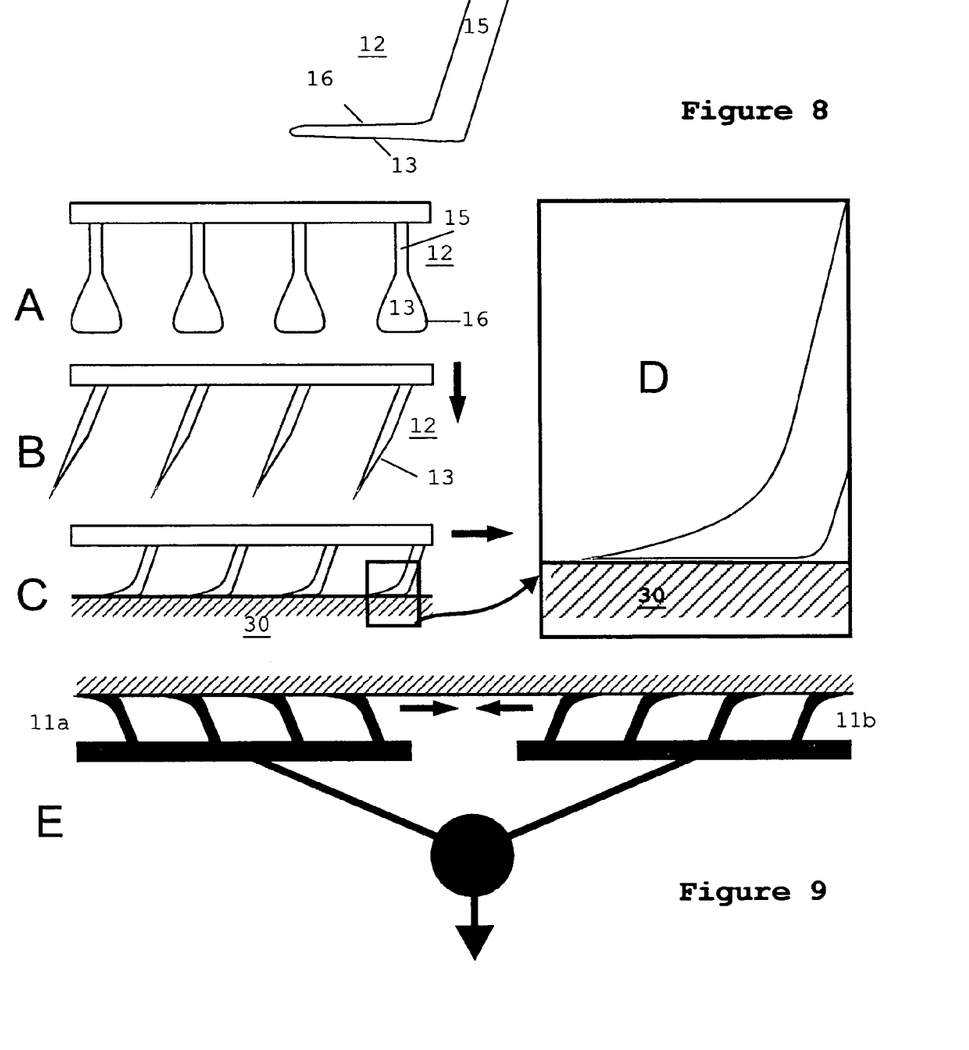

FIG. 8 diagrammatically shows a lateral view (perpendicular to the direction of inclination) of an embodiment of a projection 12 in which the head part 16 with the contact surface 13 is formed by a membrane or lamella which arises from the foot part 15 of reduced thickness and if applicable increased width (see also FIG. 9A). The membrane-shaped head part 16 has the advantage of asymmetric holding force (see below, FIG. 9). The elasticity module of the head part 16 is set in the range of 10 MPa to 4 GPa.

FIG. 9 illustrates an embodiment of the invention which due to its asymmetric holding force is highly relevant to technological application. Very substantial adhesive force is attained which can nevertheless be undone with little effort—a feature which is significant for pick-and-place applications. Sectional images A and B show lateral views of the surface structure according to the invention, with the projections 12 being parallel (A) to the direction of inclination, or perpendicular (B) to the direction of inclination. Starting with the foot parts 15, the head parts 16 are of membrane shape or lamella shape with a width in the range of 20 nm to 1000 nm and a thickness in the range of 5 nm to 100 nm. The spacing between individual projections 12 is selected depending on the application and depending on the setting of the width of the head parts 16.

Without contacting the adjoining body, the projections 12 are aligned in space at the desired inclination (sectional images A, B). If a contact is established, the head parts 16 are bent (sectional images C, D). As a result of the specified inclination of the projections 12, all the head parts 16 are bent in the same direction. The adhesion contact is formed between the front surfaces 13 and the adjacent body 30. The holding force of such an angled front surface 13 differs depending on whether a load is exerted parallel or antiparallel to the orientation of the head parts 16. Different holding forces with differently oriented loads make it possible to design an adhesive structure with increased holding force which is diagrammatically shown in sectional image E of FIG. 9.

If two surface areas 11a, 11b (of one object or of two separate objects) are provided as a holding structure, in which surface areas 11a, 11b the projections 12 are inclined in opposite directions to each other (see arrows), a larger mass 30 can be held with the holding structure than would be possible with a corresponding holding structure of the same size but with uniform inclination. This is because one holding structure compensates for the tangential forces of the other holding structure.

Analogous to the design shown in 9E, according to the invention more holding structures can be provided so as to be mirror-symmetrically opposed, for example four, six or more holding structures. If the front surfaces 13 are formed accordingly, analogously, adhesive structures comprising uneven numbers of holding structures can be formed in which the tangential forces compensate correspondingly.

Figure 10:
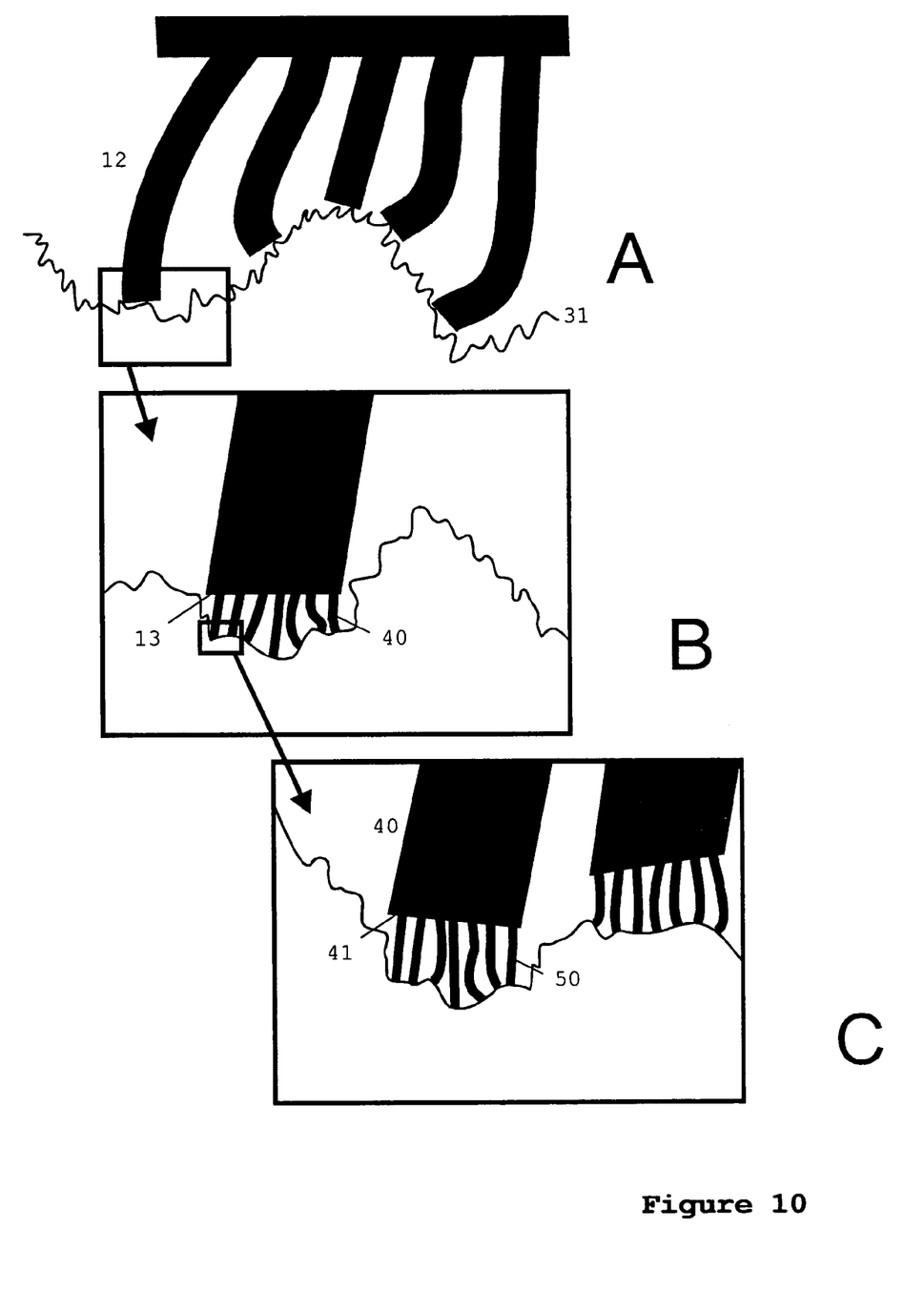

FIG. 10 illustrates the hierarchical formation of fine structures and substructures on the projections 12 of a surface structured according to the invention. By way of an example, sectional image A diagrammatically shows a real surface 31 with irregularities at various size scales. For the purpose of optimum adherence in all size ranges, the projections 12 shown in the enlarged sectional view in sectional image B comprise fine-structure projections 40 whose fine-structure front surfaces 41 in turn comprise substructure projections 50 (partial image C). According to the invention, this principle can be continued to comprise further substructures.

Generally speaking, as the size of the object which is to adhere to real surfaces increases, a larger number of hierarchical planes of the substructure are introduced. Correspondingly, the characteristics described in the present specification for characterising the projections 12 can accordingly be provided for the realisation of the fine-structure projections 40 or the substructure projections 50.

Figure 11:
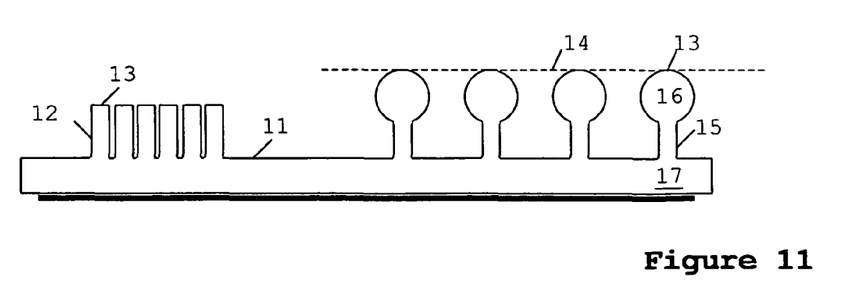
FIGS. 11 to 13: diagrammatic sectional views of various embodiments of surfaces structured according to the invention.
Figure 12:
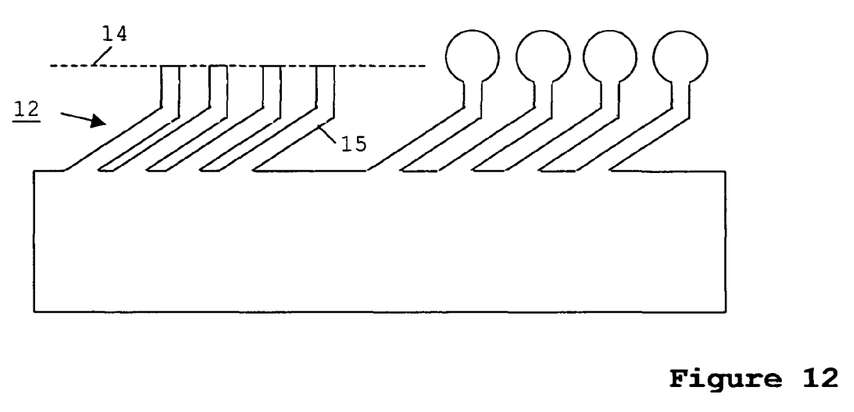
Figure 13:
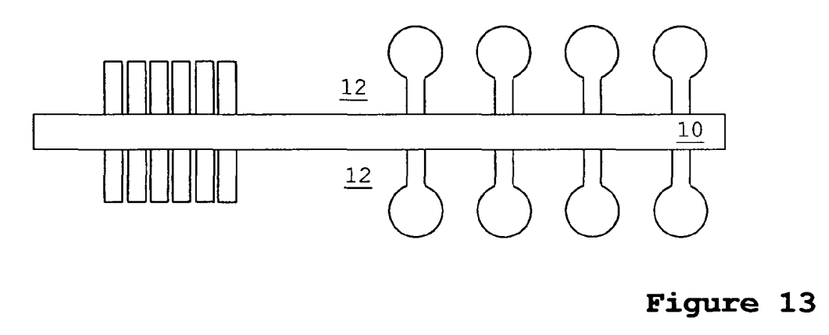

FIGS. 11 to 13 diagrammatically show sections of various surface structures in an enlarged view. These diagrams are merely used for illustrative purposes; implementation of the invention is not limited to the geometric shapes shown. According to FIG. 11, on the surface 11 of the object (carrier 17) for example bar-shaped projections 12 are formed, each of which comprises a front surface 13 which is delimited by a straight margin (e.g. rectangle, square, polygon) or a curved margin. The front surface 13 can in particular be flattened or domed according to the above-mentioned principles. Generally, each projection 12 comprises a foot part 15 and a head part 16 on whose side facing away from the object 10 the front surface 13 is formed (see right part of FIG. 11). The front surfaces 13, which are formed at the same height above the surface 11, form the contact surface 14 according to the invention.

Generally, the object is a solid body, which for example forms part of an article of daily use or the like. As shown, the object can be in the form of a layer-shaped carrier made from a flexible material (e.g. a plastic material). On the side of the carrier, which side is opposite the surface structure, additionally a conventional layer of adhesive material (see FIG. 11) or surface modification according to the invention (see FIG. 13) can be provided.

FIG. 12 shows that the foot parts 15 of projections 12 formed according to the invention can at least in part be inclined in relation to the surface 11 so as to provide the shearing characteristics explained above. The inclination can be limited to a lower part of the foot parts 15 so that the projections are inclined at a low height and are vertically aligned near the contact area 14.

FIG. 13 shows that, according to the invention, the projections 12 and the object 10 (e.g. layer-shaped carrier) generally can be made as a composite from various materials.

Figure 14:
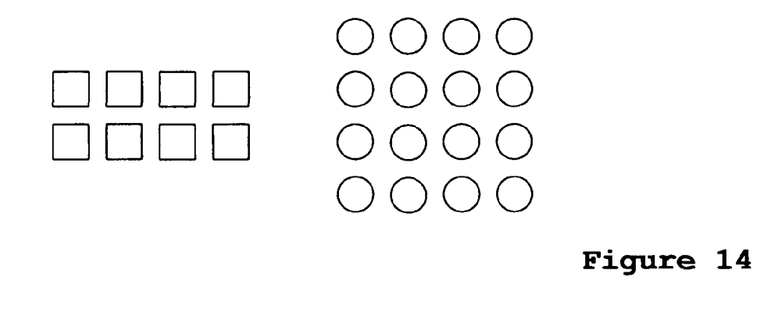
FIGS. 14 to 16: diagrammatic top views of various designs of contact surfaces.
Figure 15:
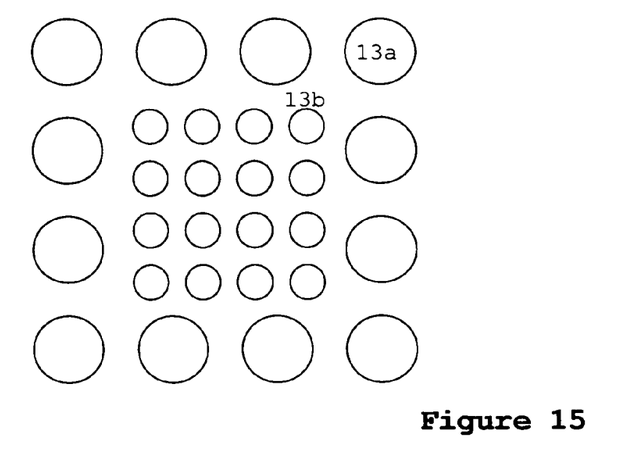

Depending on the application, the geometric characteristics of the front surfaces or microcontacts 13 formed according to the invention can be modified. By way of example, FIG. 14 shows square and round front surfaces 13. FIG. 15 shows that a contact surface (parallel to the drawing plane) can be formed by front surfaces 13a, 13b of various dimensions and/or geometric shapes. For example, parts of the contact surface can have a reduced separation force in order to facilitate the initial opening up of the adhesive connection, while other parts require stronger separation force. If necessary, after initial opening up, said separation force can be more easily applied manually or with the use of a tool.

Figure 16:
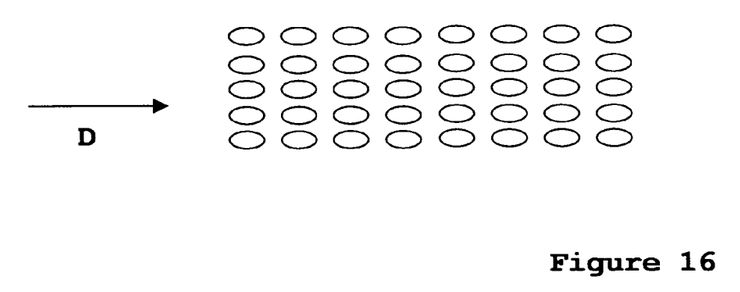

If there is a risk of the adhesive connection being opened up (pulled off) in a preferred direction, a geometric shape as shown in FIG. 16 can be provided. Preferably, the spacing between the front surfaces 13 is smaller across the direction of delamination D, than it is parallel to the direction D. Furthermore, the front surfaces are formed accordingly.

Further modifications of surfaces structured according to the invention, which modifications can be provided individually or in combination with the above-mentioned embodiments, are stated below. Firstly, the surface of the solid body can be curved. A surface may comprise several contact surfaces such as islands or geometric borders. The foot part of projections can comprise different thicknesses, so that gradients in the separation force result within a contact surface. Gradient contacts have a special advantage in that their elastic deformation is location-dependent. The microcontacts need not be arranged regularly; instead they can be arranged irregularly, e.g meandering, as a labyrinth or in some other statistical distribution.

Preferably, the projections 12 are made according to one of the following methods which are known per se:
- microlithography or nanolithography of the surfaces to be modified;
- micro printing;
- growth of projections by means of self-organisation;
- structuring techniques as known from the formation of so-called quantum dots;
- micro spark erosion (in the case of metallic surfaces), micro EDM,
- surface treatment by means of an ion beam (focussed); and
- so-called rapid prototyping with laser radiation (powder materials or polymer materials).

In principle, the production of structures according to the invention, and in particular of hierarchical structures according to FIG. 10, is possible by casting a particular shape. As an alternative to this, in particular for the production of hierarchical structures according to FIG. 10, a combination of the following technologies is possible:
- producing a mold for the first hierarchical plane (projections 12):
  - a1. laser structuring of metal surfaces (up to 100 µm) (or as an alternative:
  - a2. lithographic structuring of photoresist on an Si surface and subsequent depth etching in the Bosch process)
  - b. casting the structures with polymers (e.g. polydimethyl siloxane, polyvinyl siloxane or the like);
- layering the surface elements with adhesive material;
- flocking the surfaces by means of an electrostatic flock process of textile fibres (e.g. polyamide: diameter 10 µm, length 1 mm); and producing non-rigid contact surfaces by shearing the structures above a heated surface or by separating a thin layer of elastomeric polymer.

For the purpose of shearing, the free ends of the projections 12 are subjected to thermal forming which involves contacting all free ends of the projections 12 with a heated surface (150°-270° C.), preferably a PTFE-coated surface, and further involves drawing over the heated surface so that the free ends are deformed in a spatula-like manner.

The structures formed according to the invention for example comprise polymer (e.g. PMMA, PE, polydimethyl siloxane, polyvinyl siloxane, polyamide), metal (e.g. Ni, Cu, Au) or the like.

Applications

Surfaces that have been modified according to the invention can be provided as adhesive surfaces in all technical applications where detachable connections between different objects are to be established. This relates not only to micro-objects (characteristic dimensions in the μm and sub μm ranges) but also to macroscopic objects such as e.g. tools, textiles, paper and the like. Connections according to the invention can replace suction-type holding devices, Velcro holding devices and magnetic holding devices.

Figure 17:
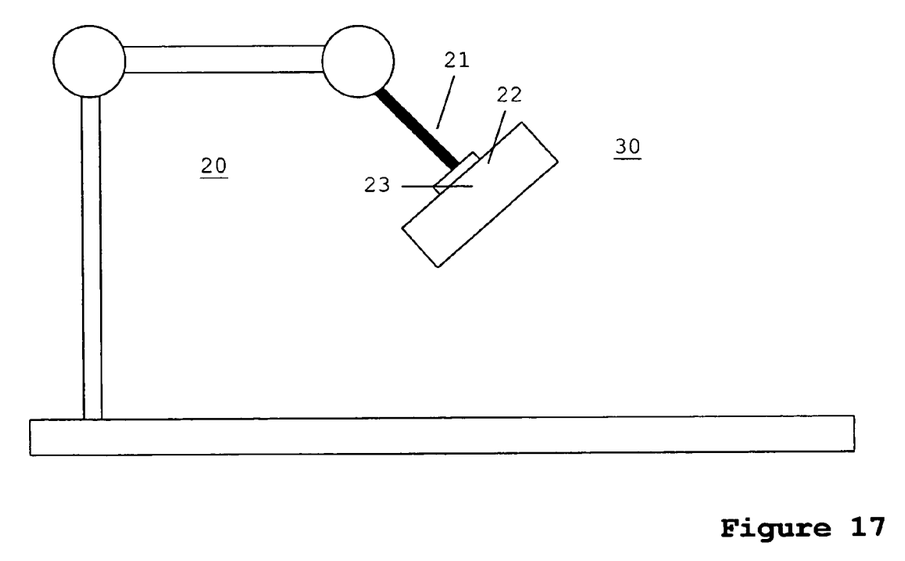
FIG. 17: a tool being provided with a surface modified according to the invention.

By way of an example, FIG. 17 shows a tool 20 comprising a manipulation arm 21 and an adhesive gripper 22 to which a diagrammatically illustrated object 30 (e.g. a tool) has been affixed by adhesion. The surface 23 of the adhesive gripper 22 comprises a microstructure according to the principles explained above, with said microstructure effecting the connection with the object 30.

The characteristics of the invention which have been disclosed in the above description, the drawings and the claims, can be of importance both individually and in combination for implementing the various embodiments of the invention.

The invention claimed is:

1. A structured solid having a contact surface, said contact surface comprising:
a structure having a multitude of projections, each projection having a foot part and a head part;
wherein each head part has a front surface which faces away from the contact surface, the contact surface being formed by a totality of the front surfaces of the multitude of projections;
wherein the contact surface is adapted to adhere to a surface of another object by van der Waals forces without establishing an anchorage and without interlocking of the projections;
wherein the projections are elastic and inclined in relation to the contact surface, and
wherein each of the projections has a radial gradient of modulus of elasticity in the foot part, whereby the modulus of elasticity gradually decreases in a radial direction through the bulk of the projection starting from the axial center of the foot part to the outer surface of the foot part; and
wherein the front surfaces of the multitude of projections provide said adherence to the surface of another object by van der Waals forces without an adhesive.

2. The structured solid according to claim 1, wherein: the projections have a density per unit area (N), a modulus of elasticity (E), a longitudinal length (a) and a thickness (b), so as to be elastic and inclined in relation to the contact surface, the projections further comprising a material whose effective modulus of elasticity (E*) is from 20 kPa to 10 MPa, where $E^* = E \cdot N \cdot b^2 \cdot (b/a)^2$.

3. The structured solid according to claim 1, wherein the radial gradient of modulus of elasticity ranges between an upper elasticity value and a lower elasticity value, wherein the upper elasticity value of the radial gradient of modulus of elasticity is between 10 MPa and 10 GPa, and the lower elasticity value of the radial gradient of modulus of elasticity is between 20 kPa and 10 MPa.

4. The structured solid according to claim 1, wherein the foot parts are formed at an angle of 45° to 89° relative to the contact surface.

5. The structured solid according to claim 4, wherein the foot parts comprise an angle of 60° to 80° relative to the contact surface.

6. The structured solid according to claim 1, wherein a mutual spacing between adjacent front surfaces is less than 10 μm.

7. The structured solid according to claim 6, wherein the mutual spacing between adjacent front surfaces is less than 5 μm.

8. The structured solid according to claim 1, wherein the projections are formed such that a cross-sectional dimension of each of the front surfaces is smaller than 20 μm and larger than 20 nm.

9. The structured solid according to claim 1, in which the front surfaces comprise at least one of the curved front surface shapes which comprise a hemispheric shape, a cylindrical shape, a torus shape or a bowl shape.

10. The structured solid according to claim 9, in which the front surface has a curved shape, the curved shape having a radius of curvature which is between 5 mm and half of the diameter of the front surface.

11. The structured solid according to claim 1, wherein the foot parts of the projections enlarge to form head parts whose thickness is less than the thickness of the foot parts.

12. The structured solid according to claim 11, wherein the membrane-shaped head parts each have a head part length and a head part width in the range of 20 nm to 1000 nm and a head part thickness in the range of 5 nm to 100 nm.

13. The structured solid according to claim 11, wherein the head parts comprise modulus of elasticity that is smaller than modulus of elasticity of the foot parts and is in the range of 10 MPa and 2 GPa.

14. The structured solid according to claim 1, wherein an aspect ratio (a/b) of the longitudinal length (a) of the projections and a cross-sectional dimension (b) of the head part front surface is at least 5:1.

15. The structured solid according to claim 1, wherein the front surface of each projection comprises a multitude of fine-structure projections each comprising fine-structure front surfaces.

16. The structured solid according to claim 15, wherein the fine-structure front surfaces comprise substructure projections.

17. The structured solid according to claim 15, wherein the thickness of the substructure projections ranges from 5 nm to 200 nm, the fine-structure projections comprise a thickness which is 10 times to 100 times the value of the thickness of the substructure projections, and the projections comprise a thickness which is 10 times to 100 times the value of the thickness of the fine-structure projections.

18. The structured solid according to claim 1, wherein an elasticity gradient extends along the contact surface.

19. The structured solid according to claim 18, wherein the projections comprise a distribution of various shapes, materials, elasticity characteristics and/or sizes.

20. The structured solid according to claim 1, wherein the structured surface comprises a carrier layer which is attached to the surface of the object.

21. The structured solid according to claim 1, wherein the projections comprise a polymer, metal, alloy, semiconductor or a ceramic material.

22. The structured solid according to claim 1, wherein a chemical modification is provided on the projections and/or on the front surfaces.

23. A solid body whose surface is at least in part a structured surface according to claim 1.

24. A pair of objects that are in contact along respective connection surfaces, wherein the connection surface of at least one of the objects is at least in part a structured surface according to claim 1.

25. A structured solid having a contact surface, said contact surface comprising:
- a plurality of projections, each projection having a foot part and a head part;
- wherein each head part has a front surface which faces away from the contact surface, the contact surface being formed by a totality of the front surfaces of the plurality of projections;
- wherein the contact surface is adapted to adhere to a surface of another object by van der Waals forces without establishing an anchorage and without interlocking of the projections;
- wherein the projections are elastic, and
- wherein each of the projections has a radial gradient of modulus of elasticity in the foot part, whereby the modulus of elasticity gradually decrease in a radial direction through the bulk of the projection starting from the axial center of the foot part to the outer surface of the foot part such that the modulus of elasticity of the foot part of each projection at its axial center is greater than the modulus of elasticity of the foot part of each projection at its outer surface; and
- wherein the front surfaces of the plurality of projections provide said adherence to the surface of another object by van der Waals forces without an adhesive.

* * * * *

UNITED STATES PATENT AND TRADEMARK OFFICE
CERTIFICATE OF CORRECTION

PATENT NO.         : 8,153,254 B2
APPLICATION NO.    : 10/515663
DATED              : April 10, 2012
INVENTOR(S)        : Edward Arzt et al.

It is certified that error appears in the above-identified patent and that said Letters Patent is hereby corrected as shown below:

Title page, insert item (73)

-- (73) Assignee: Max-Planck-Gesellschaft zur Foerderung der Wissenschaften e.V. Munich (DE) --

Signed and Sealed this
Twelfth Day of June, 2012

David J. Kappos
*Director of the United States Patent and Trademark Office*